Figure 1:
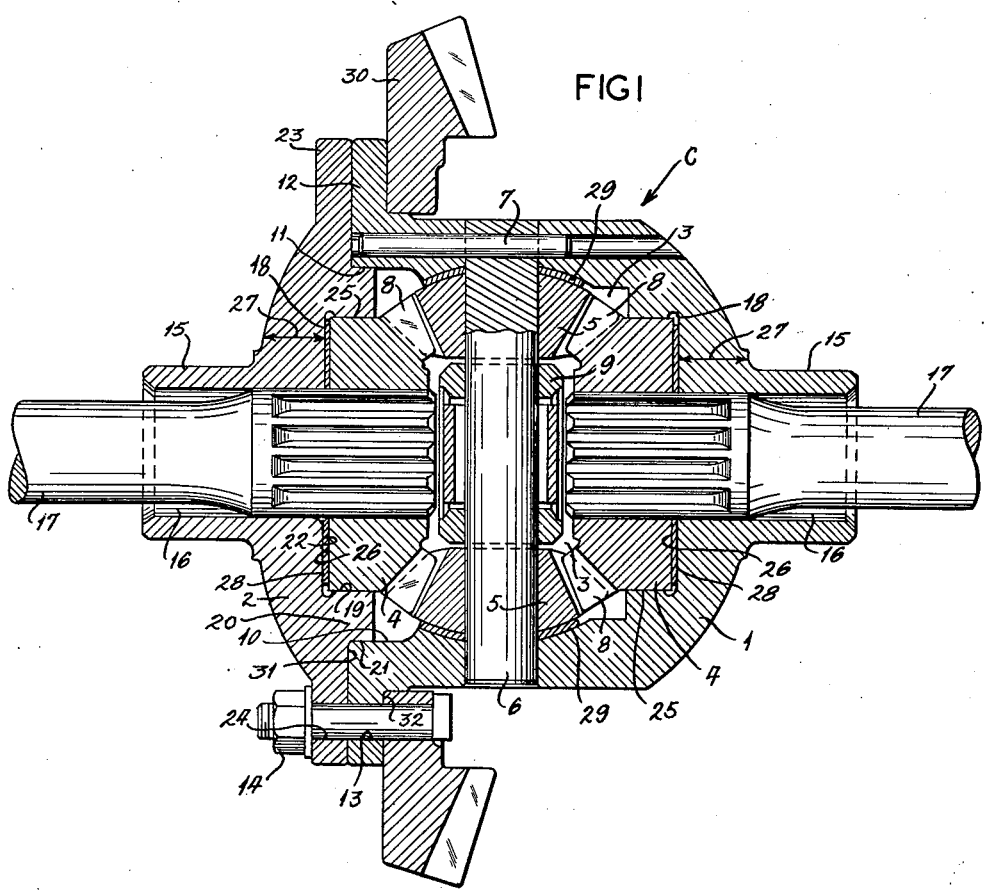

Oct. 8, 1957

E. G. BODEN 2,808,740

DIFFERENTIAL CONSTRUCTION

Filed Dec. 20, 1954

2 Sheets-Sheet 1

INVENTOR
ERNEST G. BODEN
by Gravely, Lieder, Woodruff & Wills
ATTORNEYS

Oct. 8, 1957  E. G. BODEN  2,808,740
DIFFERENTIAL CONSTRUCTION
Filed Dec. 20, 1954  2 Sheets-Sheet 2

INVENTOR
ERNEST G. BODEN
by Gravely, Lieder, Woodruff & Wills
ATTORNEYS

United States Patent Office 2,808,740
Patented Oct. 8, 1957

2,808,740

DIFFERENTIAL CONSTRUCTION

Ernest G. Boden, Canton, Ohio, assignor to The Timken Roller Bearing Company, Canton, Ohio, a corporation of Ohio Application December 20, 1954, Serial No. 476,132

2 Claims. (Cl. 74—713)

This invention relates to an improved differential construction for motor vehicles. More particularly, it relates to improved differential ring gear mountings and to differential side gear constructions and mountings for reducing deflection and improving stability under varying loads.

Because of the increase in power transmitted through ever-decreasing sizes of gears, the introduction of hypoid gears, and other design factors in modern automobile and truck construction, there have been increasing difficulties and problems resulting from deflections and instability of the differential, particularly in the ring gear and in certain portions of the differential casing. This results in extreme or abnormal wear, and gear tooth breakage. Attempts have been made to improve the stability of the ring gear, particularly in the horizontal direction, by stiffening the pedestal legs carrying the differential bearings. Even when these are stiffened to reduce deflection, the ring gear deflects in a horizontal plane due to lack of rigidity of the hub section of the differential case which takes the ring gear thrust. It has been found that a major cause of this deflection is the relatively thin section of material at the ring gear hub, due to the counterbore required for the pilot portion of conventional differential side gears.

One of the principal objects of the present invention is to provide a more rigid differential case construction without increasing the overall size. Another object is to eliminate the pilot or hub portion from conventional differential side gears thereby allowing the wall thickness of the side gear hub portions of the differential case to be increased at a vital point which provides for additional strength and for a more uniform stress distribution and hence a reduction of deflection. Another object is to provide a two-piece differential casing which is easy to manufacture.

Another object of the present invention is to pilot the differential side gears on relatively large outside diameters instead of on relatively small diameters on hub or pilot portions which necessitate thinner differential casing wall sections because of the counterbore required to receive said pilot portion. Another object is to reduce the cost of manufacturing side gears and differential casings.

These and other objects and advantages will become apparent hereinafter.

The present invention is embodied in a two-piece differential casing wherein hubless side gears are piloted on their outside circumferences thereby eliminating the necessity of pilot counterbores in the hub portions thus decreasing deflection. The invention is also embodied in a construction wherein flanges on the two casing sections and the ring gear are secured together in a manner to further reduce deflection.

Figure 2:
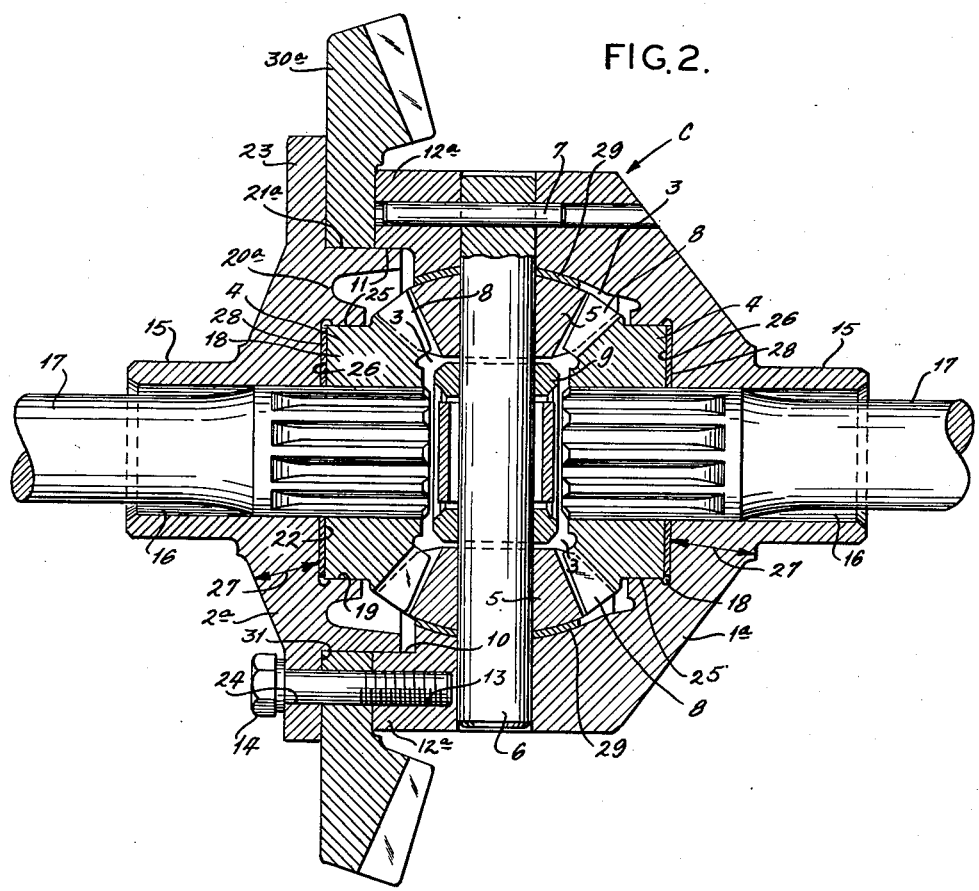

The invention also consists in the parts and in the arrangements and combinations of parts hereinafter described and claimed. In the accompanying drawings which form part of this specification and wherein like numerals and symbols refer to like parts wherever they occur:

Fig. 1 is a cross sectional view of a differential assembly embodying the present invention, and Fig. 2 is a cross sectional view of a differential construction showing a modified form of the present invention wherein the ring gear is mounted on the differential casing in a different manner.

Referring now to Fig. 1 of the drawings in detail, it will be seen that the embodiment of the invention which has been illustrated comprises a casing C having two sections 1 and 2, namely, a main body portion 1, and a side gear hub portion 2.

The casing C is provided with a relatively large hollow central chamber 3 for housing a pair of axially aligned side gears 4 and a pair of co-operating aligned pinions 5 rotatably mounted on a shaft 6 secured to the casing by means of a pin 7. The teeth of the side gears 4 and pinions 5 mesh as shown at 8. Retaining means or other suitable spacing means 9 is positioned around the shaft 6 and between the two side gears 4. The main body portion 1 has a relatively large opening 10 having an inner surface 11 and a flange 12 extending outwardly therefrom, said flange 12 being provided with holes 13 for receiving bolts 14 or other fastening means.

The casing C is provided with two axially aligned hub portions each having a laterally extending sleeve or hub 15 thereon with an opening 16 therethrough for receiving an axle section 17. The opposing hub constructions are substantially identical except that one is formed as an integral part of the main body portion 1 and the other comprises a separate side gear hub portion 2. The side gear hub portion 2 has a cavity 18 therein defined by a bore wall 19 in an annular rib 20 having an outside circumference 21. The cavities 18 connect with the large central chamber 3. An abutment means or shoulder 22 is formed between said bore 19 in said rib 20 and said opening 16 in said sleeve 15. The hub portion 2 has a flange 23 extending outwardly from said rib 20, said flange 23 being provided with holes 24 for receiving the bolts 14 or other securing means.

The side gears 4 have outer peripheral or circumferential bearing surfaces 25 and relatively flat base bearing surfaces 26. The side gears 4, as shown, are piloted on their outer surfaces 25 and eliminate the necessity of pilot hubs which are used in conventional side gears and which require counterbores in said hub portion. Thus, the wall section indicated by the numeral 27 is not weakened by a counterbore and is therefore thicker and stronger. The circumferential surface 25 bears against the rib 20 and the base 26 abuts against the shoulder 22, there being a thrust washer 28 therebetween. A thrust bearing 29 is also provided between each pinion 5 and the casing C.

A ring gear 30 is mounted on the casing C and secured thereto by the bolts 14 or other suitable means. Fig. 1 shows one embodiment of the present invention wherein the flange 12 of the main body portion 1 is adjacent to the flange 23 of the hub portion 2 with the ring gear 30 mounted inwardly thereof, said flanges 12 and 23 and ring gear 30 being secured together by means of the bolts 14. The outer circumference of the rib 20 and the flange 23 form an L-shaped pocket or rabbet 31 for receiving the flange 12 of the body portion 1 which is provided with a rabbet 32 for receiving the ring gear 30.

Fig. 2 shows a slightly modified form wherein the ring gear 30a is secured between the flanges 12a and 23a of the two casing portions 1a and 2a, said ring gear 30a and main body flange 12a fitting over and contacting the rib 20a in the side gear hub portion 2a. The relatively wider outer circumference 21a of the rib 20a and the flange 23a form a relatively deep rabbet 31a for receiving the ring gear 30a and flange 12a which both abut against said rib 20a. Except for the mounting of the ring gears, both of the illustrated constructions which embody the present invention are substantially the same.

In each of the illustrations, the design is such that the wall thickness of the side gear hub portion is relatively thick at the point illustrated by the number 27 and the ring gears 30 and 30a are mounted in relation to said side gear hub portions 2 and 2a in such a manner that the objectionable deflection is greatly minimized.

It has been determined by both dynamic and static tests with and without tapered roller bearings on the differential that the major portion of the ring gear deflections (horizontal) occur between the center line of the differential bearing bore and the pinion tooth contacts. This deflection is caused by the lack of rigidity of the flange and hub portions of conventional differential casings and is concentrated at the point of pinion mesh. The hereinbefore described construction reduces this deflection materially and produces a more rigid construction. This stiffer construction results in a considerable reduction in horizontal gear deflection under both drive and coast loading, a vase reduction in gear back face runout at pinion mesh when under load, and a more desirable progression of tooth contact lengthwise with load because of the reduced outward movement of the ring gear.

This invention is intended to cover all changes and modifications of the example of the invention herein chosen for purposes of the disclosure, which do not constitute departures from the spirit and scope of the invention.

What I claim is:

1. The improvement in differential constructions having external dimension limitations and requiring maximum resistance to thrust loads, comprising a casing having a hub section with an opening for receiving an axle section, a bore formed in said casing larger than and concentric with said opening, an abutment surface extending radially between said bore and said opening, and a hubless side gear rotatably mounted in said bore, said casing having a non-uniform cross-sectional wall thickness substantially larger at said hub section and radially outward of said bore than at the periphery of said bore.

2. In a differential construction including a casing with a hub section having an opening for receiving an axle section, and a circumferential gear secured to the casing and adapted to be driven by a spiral bevel gear whereby the driven gear is subjected to lateral thrust loads inducing a couple moment on the casing adjacent to the hub section; the improvement of which comprises the wall of said casing and a hubless side gear rotatably mounted in said casing, said casing wall having a bore formed in the interior surface thereof, the bore wall being concentric and in radially spaced relation with the axle receiving opening, said hubless side gear being mounted in said bore, and said casing wall having a larger cross-sectional thickness at said hub section relative to the thickness of said wall at the periphery of said bore and also having a larger cross-sectional thickness outwardly of said bore relative to the periphery thereof.

References Cited in the file of this patent

UNITED STATES PATENTS

| 1,176,027 | Borst | Mar. 21, 1916 |
| 1,352,910 | Ormsby | Sept. 14, 1920 |
| 2,035,929 | Wiedmaier | Sept. 8, 1936 |
| 2,102,973 | Porsche | Dec. 21, 1937 |
| 2,394,119 | Tomik | Feb. 5, 1946 |